US012547598B2

(12) United States Patent
Song et al.

(10) Patent No.: US 12,547,598 B2
(45) Date of Patent: Feb. 10, 2026

(54) SINGLE-WRITER B-TREE ARCHITECTURE ON DISAGGREGATED MEMORY

(71) Applicant: Google LLC, Mountain View, CA (US)

(72) Inventors: Zhaozhe Song, Redmond, WA (US); Pavan Edara, Sammamish, WA (US); Bigang Li, Redmond, WA (US)

(73) Assignee: Google LLC, Mountain View, CA (US)

( * ) Notice: Subject to any disclaimer, the term of this patent is extended or adjusted under 35 U.S.C. 154(b) by 65 days.

(21) Appl. No.: 18/508,730

(22) Filed: Nov. 14, 2023

(65) Prior Publication Data
US 2025/0156391 A1 May 15, 2025

(51) Int. Cl.
*G06F 16/22* (2019.01)
*G06F 13/16* (2006.01)

(52) U.S. Cl.
CPC ...... *G06F 16/2246* (2019.01); *G06F 13/1621* (2013.01); *G06F 13/1673* (2013.01)

(58) Field of Classification Search
None
See application file for complete search history.

(56) References Cited

U.S. PATENT DOCUMENTS

| | | | | |
|---|---|---|---|---|
| 8,909,677 B1 * | 12/2014 | Aguilera | ............ | G06F 16/2246 707/797 |
| 9,519,664 B1 * | 12/2016 | Kharatishvili | .......... | G06F 16/27 |
| 10,372,917 B1 * | 8/2019 | Membrives | ......... | G06F 16/9027 |
| 2014/0214767 A1 * | 7/2014 | Graefe | .................... | G06F 16/27 707/645 |
| 2014/0297985 A1 * | 10/2014 | Graefe | ................. | G06F 3/0604 711/165 |
| 2014/0324782 A1 * | 10/2014 | Graefe | ............... | G06F 11/1471 707/646 |

FOREIGN PATENT DOCUMENTS

| | | | | |
|---|---|---|---|---|
| CN | 104461399 A | * | 3/2015 | ......... G06F 12/0246 |
| CN | 114860724 A | * | 8/2022 | |

OTHER PUBLICATIONS

Memory Disaggregation: Research Problems and Opportunities, Liu et al, IEEE 39th International Conference on Distributed Computing Systems (ICDCS) (Year: 2019).*

(Continued)

*Primary Examiner* — Augustine K. Obisesan
(74) *Attorney, Agent, or Firm* — Shumaker & Sieffert, P.A.

(57) ABSTRACT

A method for a single writer B-tree architecture on disaggregated memory includes receiving a write request for a distributed database that requests the data processing hardware update the distributed database. The distributed database is indexed using a B-tree stored on a plurality of servers. Each server of the plurality of servers stores a portion of the B-tree. The method includes modifying, using the write request, a portion of a fixed-size buffer pool. The fixed-size buffer pool is stored at local memory of a primary server of the plurality of servers and corresponds to a portion of the B-tree. The method includes, in response to modifying the portion of the fixed-size buffer pool, writing, to a respective server of the plurality of servers that stores the corresponding portion of the B-tree, the modified portion of the fixed-size buffer pool.

16 Claims, 7 Drawing Sheets

(56) References Cited

OTHER PUBLICATIONS

Cao et al., "PolarDB Serverless: A Cloud Native Database for Disaggregated Data Centers", Jun. 2021, 13 pp.
Sowell et al., "Minuet: A Scalable Distrubuted Multiversion B-Tree", May 30, 2012, 12 pp.
Wang et al., "Sherman: A Write-Optimized Distributed B Tree Index on Disaggregated Memory", Jun. 2022, 16 pp.
Ziegler et al., "ScaleStore: A Fast and Cost-Efficient Storage Engine using DRAM, NVMe, and RDMA", Jun. 2022, 16 pp.

* cited by examiner

SINGLE-WRITER B-TREE ARCHITECTURE ON DISAGGREGATED MEMORY

TECHNICAL FIELD

This disclosure relates to single writer B-tree architectures for disaggregated memory.

BACKGROUND

After the recent success of disaggregated storage and computation in cloud database systems, there has been an emerging interest in memory disaggregation architectures. Tree data structures such as B-trees are an important data structure for traditional database indexes. However, these traditional designs do not translate to a high-performance distributed setting, such as the settings required for many applications using disaggregated memory architectures.

SUMMARY

One aspect of the disclosure provides a method for a single writer B-tree architecture on disaggregated memory. The computer-implemented method, when executed by data processing hardware, causes the data processing hardware to perform operations. The operations include receiving a write request for a distributed database that requests the data processing hardware update the distributed database. The distributed database is indexed using a B-tree stored on a plurality of servers. Each server of the plurality of servers stores a portion of the B-tree. The operations include modifying, using the write request, a portion of a fixed-size buffer pool. The fixed-size buffer pool is stored at local memory of a primary server of the plurality of servers and corresponds to a portion of the B-tree. The operations include, in response to modifying the portion of the fixed-size buffer pool, writing, to a respective server of the plurality of servers that stores the corresponding portion of the B-tree, the modified portion of the fixed-size buffer pool.

Implementations of the disclosure may include one or more of the following optional features. In some implementations, writing the modified portion of the fixed-size buffer pool includes using an in-memory cluster-level file system. In some of these implementations, each write request maps to a single transaction of the in-memory cluster-level file system. Optionally, writing the modified portion of the fixed-size buffer pool includes, prior to writing the modified portion of the fixed-size buffer pool, determining that another pending write based on a second write request modified the same portion of the fixed-size buffer pool and, based on determining that the other pending write modified the same portion of the fixed-size buffer pool, writing, to the respective server of the plurality of servers, the modified portion of the fixed-size buffer pool in an order based on an order the write request and the second write request were received.

In some examples, writing the modified portion of the fixed-size buffer pool includes, prior to writing the modified portion of the fixed-size buffer pool, determining that another pending write based on a second write request modified a different portion of the fixed-size buffer pool and, based on determining that the other pending write modified the different portion of the fixed-size buffer pool, writing, to the respective server of the plurality of servers, the modified portion of the fixed-size buffer pool in an order that is not based on an order the write request and the second write request were received. Optionally, writing the modified portion of the fixed-size buffer pool includes, prior to writing the modified portion of the fixed-size buffer pool, determining that another pending write based on a second write request modified the same portion of the fixed-size buffer pool and, in response to determining that the other pending write modified the same portion of the fixed-size buffer pool, writing, to the respective server, the modified portion based on the write request and the modified portion based on the second write request simultaneously.

In some examples, writing the modified portion of the fixed-size buffer pool includes pushing a write for the modified portion of the fixed-size buffer pool into a first in first out (FIFO) data structure. In some of these examples, writing the modified portion of the fixed-size buffer pool further includes generating, using each write stored in the FIFO, a dependency graph. Writing the modified portion of the fixed-size buffer pool further may include batching multiple writes together based on the dependency graph.

The operations further include receiving a read request for the distributed database, the read request requesting the data processing hardware read data from the distributed database. These operations may also include, based on receiving the read request, retrieving, from a second subset of the plurality of servers, one or more portions of the B-tree and storing the one or more portions of the B-tree at a second fixed-size buffer pool for the B-tree. The second fixed-size buffer pool is stored at local memory of a secondary server of the plurality of servers and the second server is different from the primary server. The operations may also include retrieving, using the second fixed-size buffer pool, the data.

Another aspect of the disclosure provides a system for a single writer B-tree architecture on disaggregated memory. The system includes data processing hardware and memory hardware in communication with the data processing hardware. The memory hardware stores instructions that when executed on the data processing hardware cause the data processing hardware to perform operations. The operations include receiving a write request for a distributed database that requests the data processing hardware update the distributed database. The distributed database is indexed using a B-tree stored on a plurality of servers. Each server of the plurality of servers stores a portion of the B-tree. The operations include modifying, using the write request, a portion of a fixed-size buffer pool. The fixed-size buffer pool is stored at local memory of a primary server of the plurality of servers and corresponds to a portion of the B-tree. The operations include, in response to modifying the portion of the fixed-size buffer pool, writing, to a respective server of the plurality of servers that stores the corresponding portion of the B-tree, the modified portion of the fixed-size buffer pool.

This aspect may include one or more of the following optional features. In some implementations, writing the modified portion of the fixed-size buffer pool includes using an in-memory cluster-level file system. In some of these implementations, each write request maps to a single transaction of the in-memory cluster-level file system. Optionally, writing the modified portion of the fixed-size buffer pool includes, prior to writing the modified portion of the fixed-size buffer pool, determining that another pending write based on a second write request modified the same portion of the fixed-size buffer pool and, based on determining that the other pending write modified the same portion of the fixed-size buffer pool, writing, to the respective server of the plurality of servers, the modified portion of the fixed-size buffer pool in an order based on an order the write request and the second write request were received.

In some examples, writing the modified portion of the fixed-size buffer pool includes, prior to writing the modified portion of the fixed-size buffer pool, determining that another pending write based on a second write request modified a different portion of the fixed-size buffer pool and, based on determining that the other pending write modified the different portion of the fixed-size buffer pool, writing, to the respective server of the plurality of servers, the modified portion of the fixed-size buffer pool in an order that is not based on an order the write request and the second write request were received. Optionally, writing the modified portion of the fixed-size buffer pool includes, prior to writing the modified portion of the fixed-size buffer pool, determining that another pending write based on a second write request modified the same portion of the fixed-size buffer pool and, in response to determining that the other pending write modified the same portion of the fixed-size buffer pool, writing, to the respective server, the modified portion based on the write request and the modified portion based on the second write request simultaneously.

In some examples, writing the modified portion of the fixed-size buffer pool includes pushing a write for the modified portion of the fixed-size buffer pool into a first in first out (FIFO) data structure. In some of these examples, writing the modified portion of the fixed-size buffer pool further includes generating, using each write stored in the FIFO, a dependency graph. Writing the modified portion of the fixed-size buffer pool further may include batching multiple writes together based on the dependency graph.

The operations further include receiving a read request for the distributed database, the read request requesting the data processing hardware read data from the distributed database. These operations may also include, based on receiving the read request, retrieving, from a second subset of the plurality of servers, one or more portions of the B-tree and storing the one or more portions of the B-tree at a second fixed-size buffer pool for the B-tree. The second fixed-size buffer pool is stored at local memory of a secondary server of the plurality of servers and the second server is different from the primary server. The operations may also include retrieving, using the second fixed-size buffer pool, the data.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Based on the recent success of disaggregated storage and computation in cloud database systems, there has been an emerging interest in memory disaggregation architectures. Disaggregated memory refers to the paradigm of separate computing nodes from memory nodes to improve memory utilization and scalability. These cloud database systems use indexes to provide efficient ways to access records of the database. Tree data structures such as B-trees are an important data structure for traditional database indexes. However, these traditional designs do not translate to a high-performance distributed setting, such as the settings required for many applications using disaggregated memory architectures.

Implementations herein are directed toward a B-tree controller that includes a high-performance single-write/multi-reader design over disaggregated memory. The B-tree controller may integrate with a cluster-level file system to modify a B-tree that is stored across multiple computing machines or servers (i.e., disaggregated memory) without relying on global lock tables that reduce performance. The B-tree controller may serve as, for example, a database index or a generic distributed in-memory key-value store.

Figure 1:
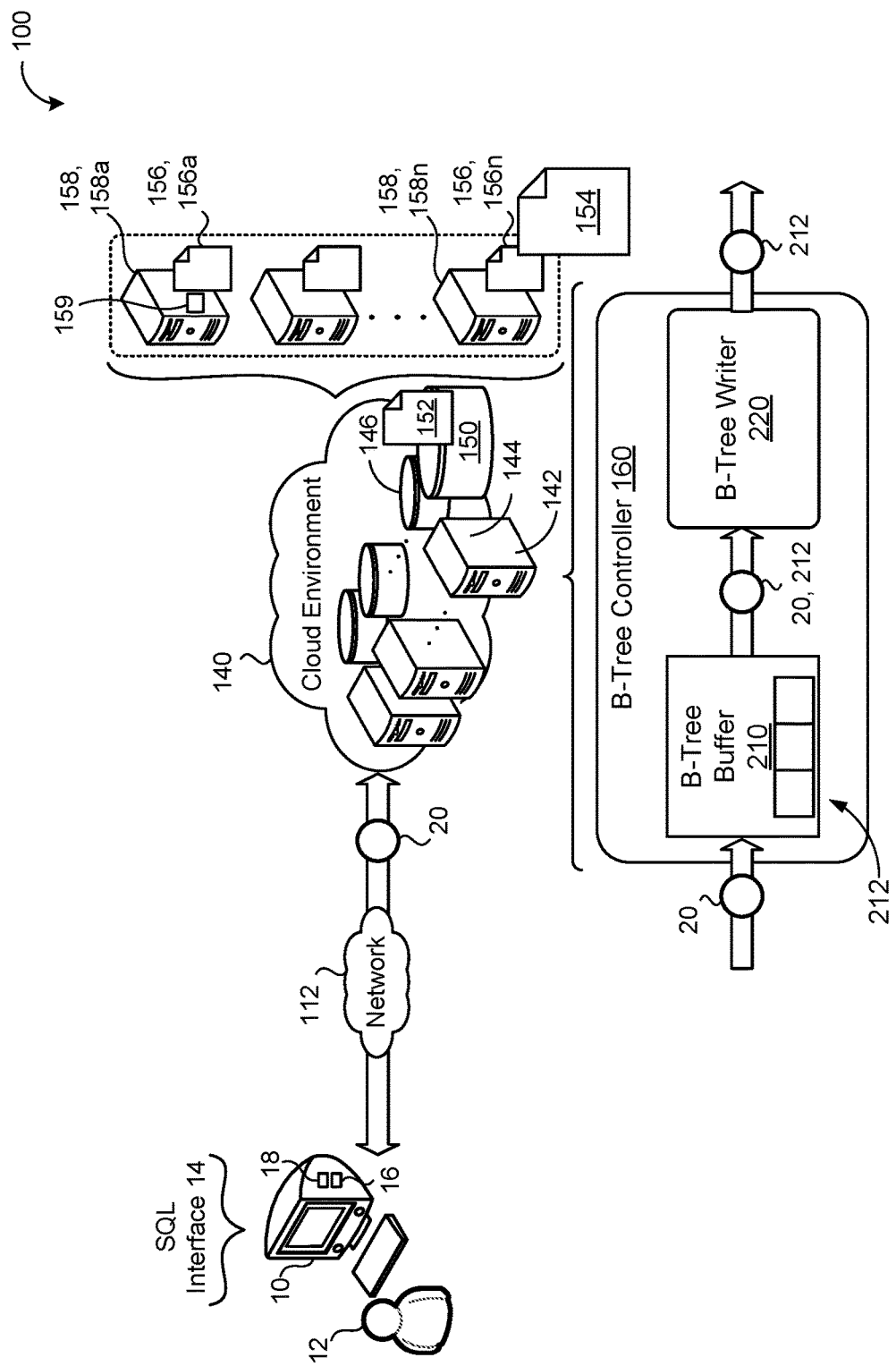
FIG. 1 is a schematic view of an example system for a single writer B-tree architecture on disaggregated memory.

Referring to FIG. 1, in some implementations, a cloud database system 100 includes a remote system 140 in communication with one or more user devices 10 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the clients (e.g., the user device 10) or the computing resources 144. The data store 150 may be configured to store one or more databases 152 or tables (i.e., a cloud database).

The remote system 140 is configured to receive database queries 20 (i.e., a request 20) from user devices 10 each associated with a respective user 12 via, for example, the network 112. Each user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). The users 12 may construct the database query 20 (also referred to herein as a write request 20) using a Structured Query Language (SQL) interface 14, although other interfaces may also be used. The database query 20 requests the remote system 140 to query or interact with one or more of the databases 152. For example, the query 20 may request the database to conditionally return data from the database 152, add additional data to the database 152, and/or modify data in the database 152. Any number of users 12 or user devices 10 may query the database 152 concurrently or in parallel. For example, the database 152 is a distributed cloud database serving hundreds or thousands (or more) users simultaneously. Other entities may additionally or alternatively interact with the database (e.g., applications executing on the remote system 140 or on other remote servers).

In some implementations, a database 152 has a database index 154. The database index 154 is a self-balancing tree data structure or a B-tree 154. A B-tree is a tree of nodes starting with a root node and ending with leaf nodes. Each node includes one or more keys, and the keys act as separation values that divide the subtrees. The database index 154 improves the speed of retrieval operations on the database 152. The database index 154 is divided into a number of portions 156, 156a-n (e.g., pages, chunks, or any other division of the database index 154). The portions 156 are distributed across a plurality of servers 158, 158*a-n* or other computing/memory nodes. Each server 158 includes local memory 159 that stores one or more portions 156 of the database index 154 (i.e., the B-tree 154). The servers 158 may be part of the remote system 140 to provide a disaggregated memory architecture for the users 12.

The remote system 140 executes a B-tree controller 160. The B-tree controller 160 receives write requests 20 for the distributed database 152. The B-tree controller 160 includes a buffer pool 210. The buffer pool 210 maintains a copy of at least a portion of the B-tree at local memory of one of the servers 158 (i.e., a primary server 158 or a writer server 158) or other computational resource. The primary server 158 may have different computational resources (e.g., more resources) than other servers 158 that do not serve as a primary server 158. The buffer pool 210 includes a number of buffer portions 212, with each buffer portion 212 corresponding to a respective B-tree portion 156. That is, the buffer pool 210 maintains a local copy or "cache" of at least a portion of the B-tree 152 in local memory (e.g., local RAM) of the primary server 158.

In some examples, the buffer pool 210 is a fixed-size buffer pool 210 that uses an eviction strategy to maintain the buffer portions 212 that correspond to the most relevant (e.g., most frequently or most recently accessed) B-tree portions 156. In some implementations, the fixed-size buffer pool is smaller than the database index 154 and thus can only store a portion of the database index 154. When the fixed-size buffer pool 210 is full and a write request 20 references a B-tree portion 156 not currently located in the buffer pool 210, the B-tree controller 160 may evict an existing buffer portion 212 to make room for the new buffer portion 212. In some examples, the B-tree controller 160 evicts the buffer portion 212 that has gone the longest time without being accessed (via a read and/or via a write).

The B-tree controller 160 modifies, using the write request 20, the buffer pool 210. That is, the B-tree controller 160 updates the buffer pool based on the data and/or locations of the write request 20 in order to maintain the database index 154. For example, the B-tree controller 160 updates one or more buffer portions 212 to reflect required updates to the database index 154 as a result of the write request 20 (i.e., as a result of a write to the database 152). The B-tree controller 160 updates the buffer portion 212 that corresponds to the respective B-tree portion 156 associated with the write request 20.

The B-tree controller 160 includes a B-tree writer 220. As discussed in more detail below, the B-tree writer 220, in response to the modifications to the buffer pool 210, writes the modified buffer portions 212 to the respective servers 158 that store the corresponding B-tree portions 156 of the database index 154. Optionally, the B-tree writer 220 writes the modified buffer portions 212 to the servers 158 as soon as possible (bandwidth and system resources permitting). This is in contrast to traditional B-trees where updates are generally only flushed when a buffer overflows or based on some other opportunistic event. In some examples, the B-tree writer 220 executes (e.g., as a background process) to asynchronously write the buffer portions 212 to the respective servers 158. Optionally, the B-tree writer 220 uses a dedicated thread pool and does not need to block the completions of the writes. The B-tree controller 160 may update or maintain a log using a write-ahead logging (WAL) technique for tracking updates to the database 152 for recovery and replay purposes.

Figure 2:
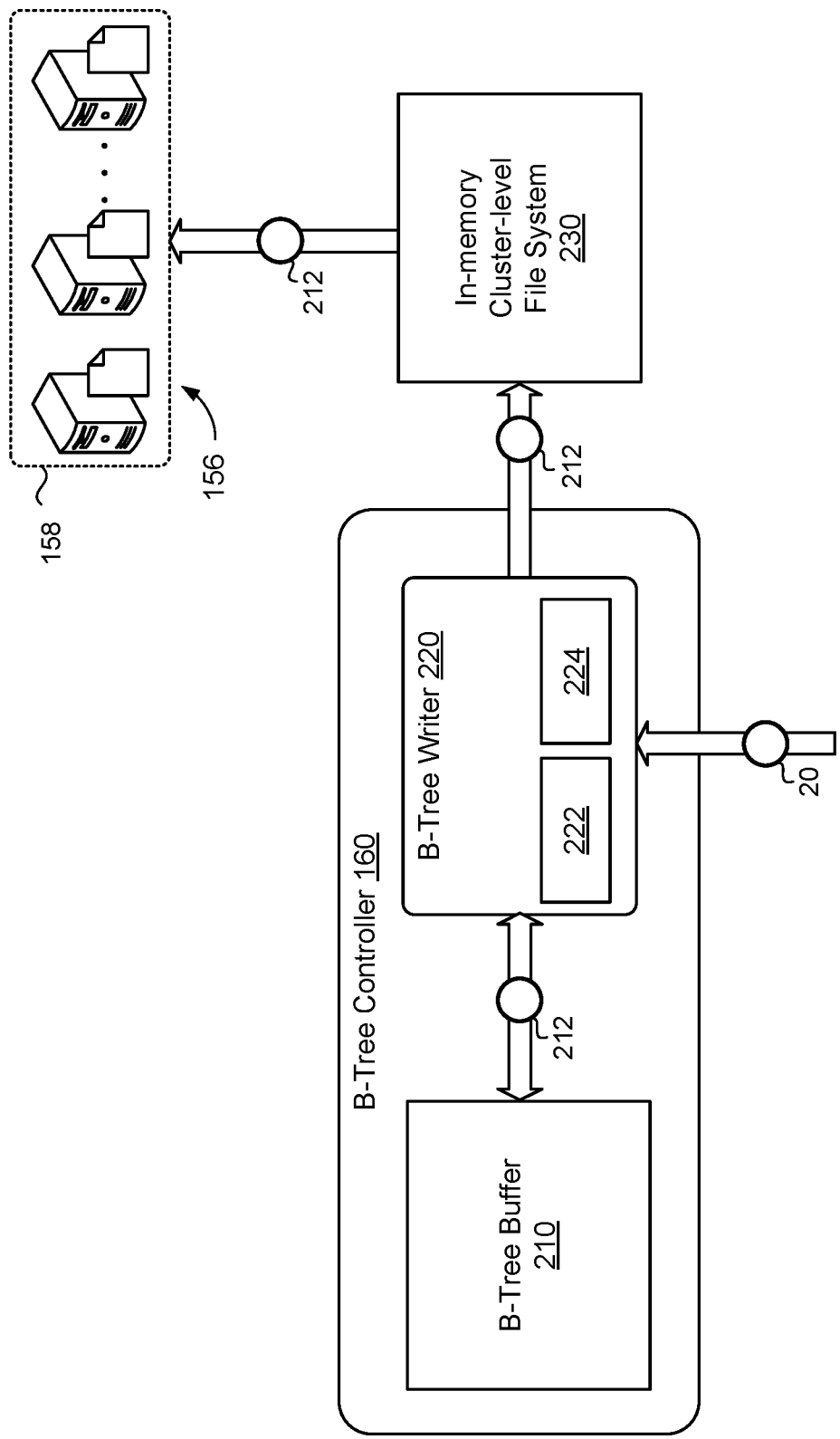
FIG. 2 is a schematic view of a B-tree writer of the system of FIG. 1.

Referring now to FIG. 2, in some implementations, the B-tree writer 220 writes the modified buffer portions 212 to the servers 158 via a cluster-level file system 230. The cluster-level file system 230 may use principles from remote memory access (RMA). Optionally, the cluster-level file system 230 is based on one-sided RMA (i.e., no computation required on the remote side/servers 158). The cluster-level file system 230 provides native transactions with transactional writes. Optionally, each write request 20 maps to a single transaction of the cluster-level file system 230. That is, every B-tree update request maps to a single transaction over the cluster-level file system 230 no matter how many nodes the write modifies. The cluster-level file system 230 may provide an abstraction for the disaggregated memory (i.e., the splitting of the B-tree portions 156 among the servers 158) from the B-tree controller 160.

In some implementations, the B-tree writer 220 pushes each pending write to the cluster-level file system 230 (i.e., writes to modify/update the B-tree portions 156) into a queue 222. Optionally, the queue 222 is a first in first out (FIFO) queue to maintain an order of the writes. The B-tree writer 220 may push or flush writes to the queue 222 immediately upon receipt from the B-tree controller 160 as opposed to waiting for the buffer pool 210 to overflow. Optionally, the B-tree writer 220 is a background process that asynchronously writes to the cluster-level file system 230 without blocking.

Based on the writes within the queue 222, the B-tree writer 220, in some examples, generates a dependency graph 224. The dependency graph 224 defines the dependencies between the writes within the queue 222 (i.e., describes changes to the B-tree 154 as the result of one or more writes that are pending the queue 222 and not yet written to the servers 158). Dependencies between writes indicate that the order that the writes occur matters. Writes that do not have any dependencies may be written to the servers 158 in any order relative to each other (i.e., arbitrary order). In some examples, the B-tree writer is multi-threaded (i.e., has two or more threads simultaneously preparing writes for the cluster-level file system 230). The dependency graph 224 explicitly captures the ordering relationship among the writes within the queue 222 to ensure that dependencies are respected while flushing the queue. For example, the B-tree writer 220 uses a locking algorithm (such as node level read-write locks) to ensure that two threads cannot attempt to modify the same node of the B-tree 154 simultaneously. The dependency graph 224 may represent a flush buffer with a configurable maximum size that may back-pressure incoming write requests 20. The B-tree writer 220 may empty the queue 222 as rapidly as bandwidth/throughput to the servers 158 via the cluster-level file system 230 allows.

Figures 3A, 3B:
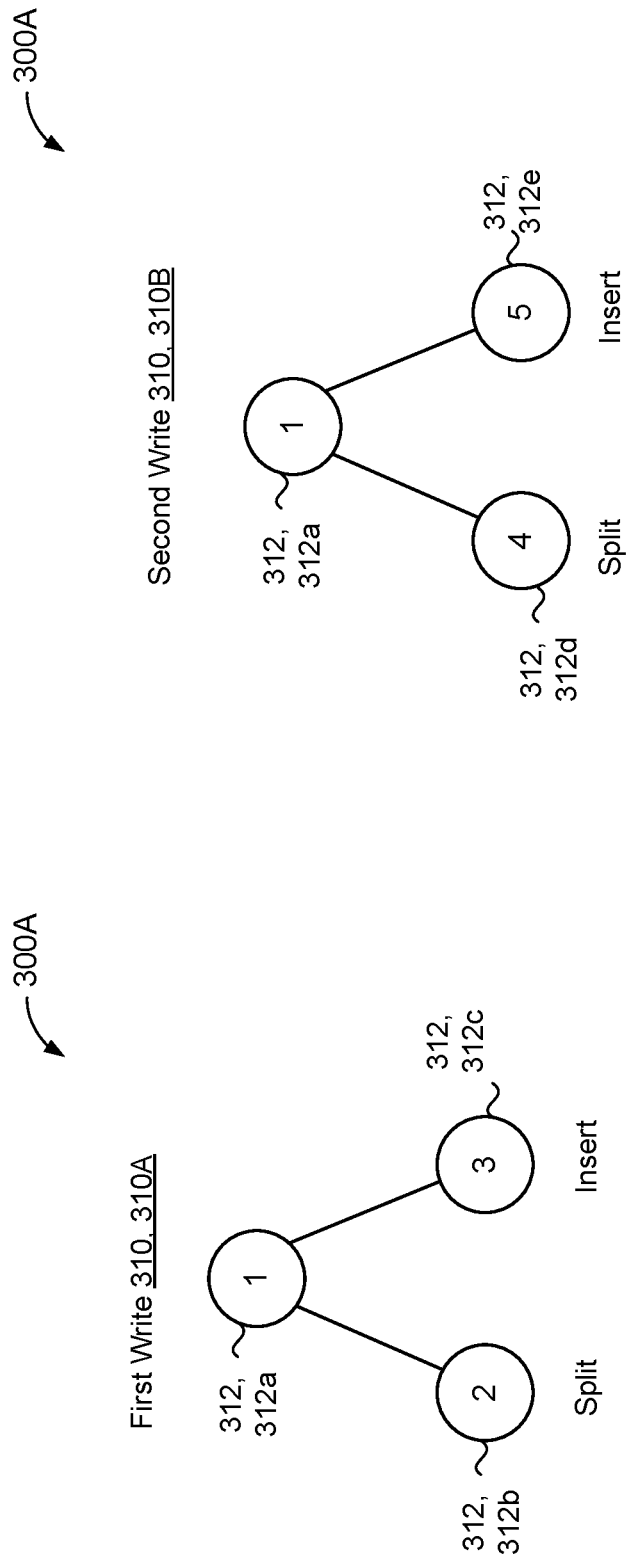
FIGS. 3A-3C are schematic views of operations on nodes of a B-tree.
Figure 3C:
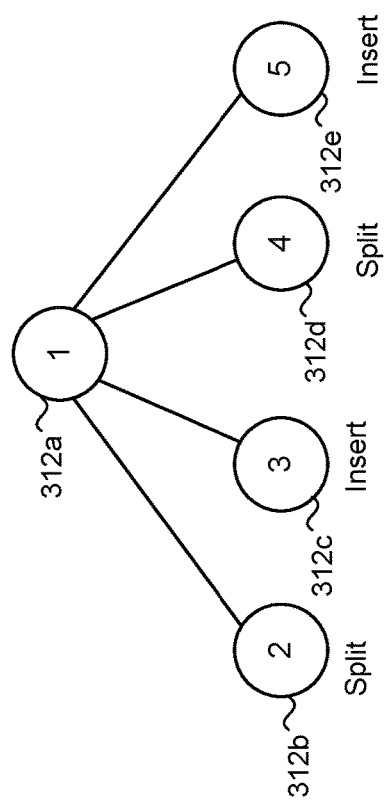

Referring now to FIGS. 3A-3C, the B-tree writer 220 may ensure that writes with dependencies are written to the servers 158 in the order defined by the dependency graph 224. For example, the B-tree writer 220 determines that a first pending write 310 (i.e., a write or B-tree operation derived from write request 20 that modifies one or more nodes 312 of the B-tree 154 that is pushed into the queue 222) based on a first write request 20 and another second pending write 310 based on a second write request 20 each modify the same portion 212 of the fixed-size buffer pool 210 (e.g., modify or affect the same nodes 312 of the B-tree 154). Based on determining the writes affect the same portions 212, the B-tree writer 220 writes, to the respective server(s) 158, the modified portion 212 of the fixed-size buffer pool 210 in an order based on an order the first and second write requests 20 were received. In another example, the B-tree writer 220 determines that a first pending write 310 based on a first write request 20 and another second pending write 310 based on a second write request 20 do not modify the same portion 212 of the fixed-size buffer pool 210 (e.g., modify or affect different nodes 312 of the B-tree 154). Based on determining the writes do not affect the same portions 212, the B-tree writer 220 writes, to the respective server(s) 158, the modified portions 212 of the fixed-size buffer pool 210 in an order that is not based on an order the first and second write requests 20 were received.

In some examples, the B-tree writer 220, for each B-tree operation (i.e., each write for the queue 222), determines a delta set for the operation defining the changes to each node of the B-tree 154 for the operation. For example, when the operation does not include a node split (which may be the majority of operations), the delta set consists of only a leaf node change. Optionally, the B-tree writer 220 batches together operations (i.e., puts the operation in the same transaction for the cluster-level file system 230) pending in the flush buffer or queue 222 that affect the same node. Each delta set may always be contained within the same transaction of the cluster-level file system 230 (i.e., the changes represented by a delta set are never split across multiple transactions) to keep the B-tree 154 valid at all times and to simplify recovery.

The B-tree writer 220, in some examples, opportunistically batches or combines writes 310 from the queue 222 together to increase throughput through the cluster-level file system 230. For example, the B-tree writer 220 determines that a first pending write 310 based on a first write request 20 and a second pending write 310 based on a second write request 20 each modify the same portion of the buffer pool 210 (e.g., modify overlapping nodes 312 of the B-tree 154). In response to determining that the pending writes modified the same portion of the buffer pool 210, the B-tree writer 220 writes, to the respective server(s) 158, the modified portion 156 from both writes 310 simultaneously.

The B-tree writer 220 may use the dependency graph 224 and/or delta sets to coordinate batching and flush or write order. That is, the B-tree writer 220 may batch writes 310 together based on the dependency graph 224 and/or the delta sets. For example, if two pending (e.g., in the queue 222) B-tree 154 updates have overlaps in the set of modified nodes 312, the two updates are merged or batched together into a single transaction to save round trips for the cluster-level file system 230. Accordingly, reads and writes through the cluster-level file system 230 have no conflicts between each other to improve performance. In some implementations, the B-tree controller 160 prevents a node 312 from being evicted from the B-tree buffer 210 while there are still changes to the node 312 that need to be flushed (i.e., committed to the B-tree 154 at the servers 158). As a result, such nodes 312 will never trigger a buffer pool cache miss and reads caused by cache misses and writes will always be a disjoint set of nodes and accordingly cannot conflict. Additionally, because all writes are coordinated according to the dependency graph 224, there cannot be conflicts between reads and writes.

In the examples of FIGS. 3A and 3B, schematic view 300A (FIG. 3A) includes a first write 310, 310A (i.e., a first operation or write derived from a write request 20 and placed in the queue 222) and schematic view 300B (FIG. 3B) includes a second write 310, 310B. The first write 310A and the second write 310B are both insert operations that affect the same parent node 312, 312a. More specifically, the first write 310A splits a second node 312, 312b of the first node 312a into the second node 312b and a third node 312, 312c. The second write 310B splits a fourth node 312, 312d of the first node 312a into the fourth node 312d and a fifth node 312, 312e. As shown in schematic view 300B of FIG. 3C, the B-tree writer 220 may batch the two writes 310A, 310B into a single batched write 310, 310C (i.e., a batched transaction) that performs both inserts simultaneously. The B-tree writer 220 may opportunistically batch many other combinations of writes 310. As a simple example, the B-tree writer 220 may batch together multiple consecutive inserts that modify the same leaf node 312. In this example, the B-tree writer 220 may only write the value for the last or latest write to the node 312. More particularly, if a write 310 modifies a particular node 312 to have a <key, value> pair of <key 1, value 5> and then a subsequent write 310 modifies the same particular node 312 to have a <key, value> pair of <key 2, value 7>, the B-tree writer 220 may discard the first write 310 and only flush or commit the second write or perform both modifications in a single transaction of the cluster-level file system 230. The B-tree writer 220, in some examples, limits a number of writes 310 batched together based on a configurable max batching threshold.

Figure 4:
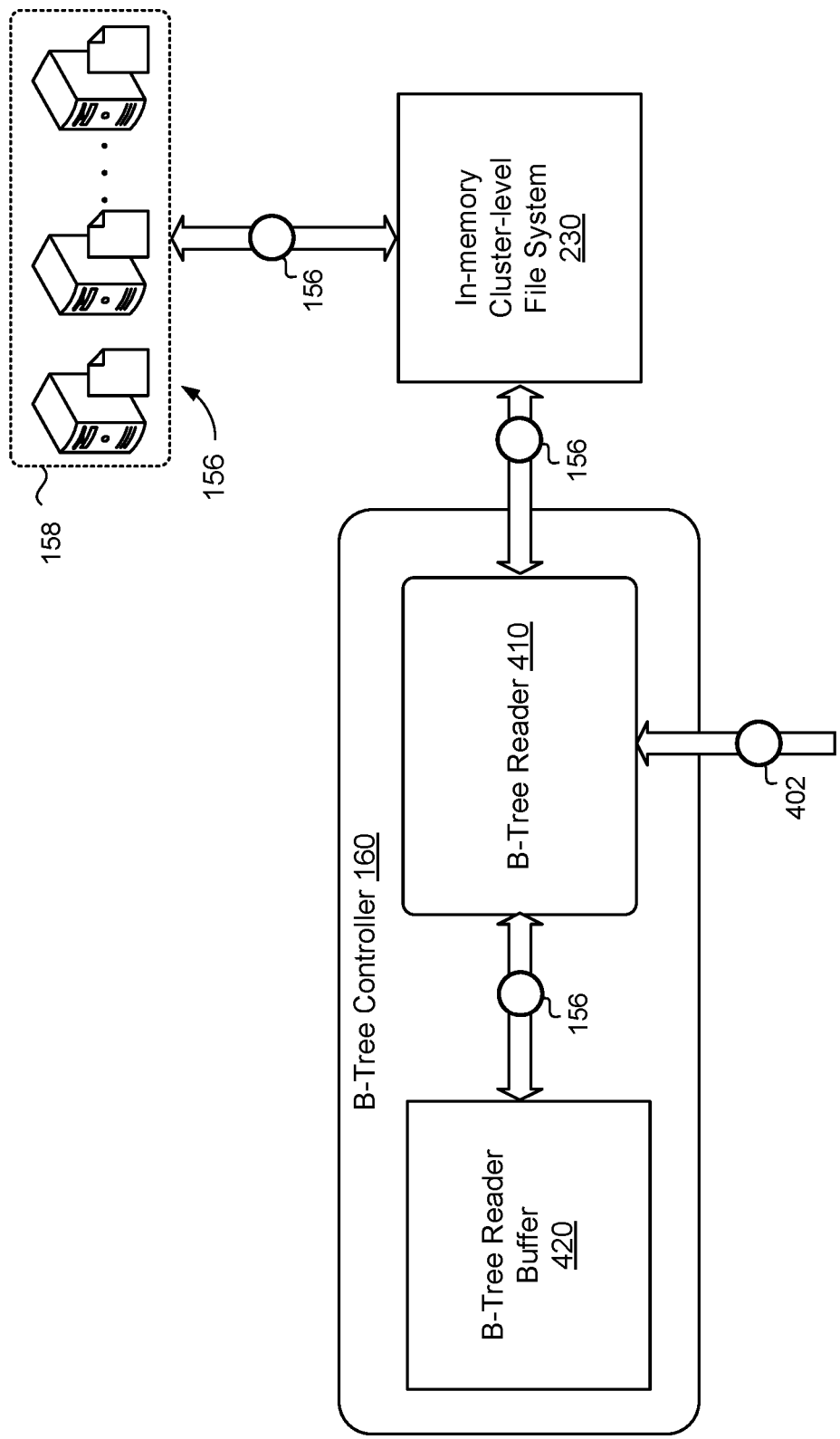
FIG. 4 is a schematic view of a B-tree reader of the system of FIG. 1.

Referring now to FIG. 4, in some implementations, the B-tree controller 160 includes one or more B-tree readers 410. Each B-tree reader 410 may execute at local memory on a secondary server 158 to service read requests for the B-tree 154. In some examples, the primary server 158 (i.e., that hosts the B-tree writer 220), in addition to one or more other servers 158, is also a secondary server 158 (i.e., that hosts a B-tree reader 410). The primary server 158 always has the most up to date B-tree 154 without any staleness.

The B-tree controller 160 may include any number of B-tree readers 410 executing on any number of the server 158 (i.e., a single writer, multiple reader architecture). For example, one or more servers 158 host B-tree readers 410 in addition to the primary server 158 to prevent overloading of the primary server 158. The B-tree reader 410 receives a read request 402 for the distributed database 152 requesting the data processing read data from the distributed database 152. Based on receiving the read request 402, the B-tree reader 410 retrieves, from one or more other servers 158 (i.e., a subset of the servers 158), one or more portions 156 of the B-tree 154. For example, the B-tree reader 410 maintains a B-tree reader buffer 420 (i.e., a second fixed-size buffer pool) in local memory and updates the B-tree reader buffer 420 based on the B-tree portions 156 received via, for example, the cluster-level file system 230. That is, the B-tree reader 410 stores the one or more portions 156 of the B-tree 154 at the second fixed-size buffer 420. The B-tree reader 410, using the B-tree reader buffer 4230, retrieves the read data requested by the read request 402 (or directs another module or system to the location of the read data for retrieval).

The B-tree reader buffer 420 serves as a local cache for portions of the B-tree 154 for the B-tree reader 410. The B-tree reader buffer 420 may include eviction strategies similar to the B-tree buffer pool 210. Before relying on the B-tree reader buffer 420, the B-tree reader may determine whether the B-tree reader buffer 420 is up to date (i.e., whether the B-tree writer 220 has performed any relevant updates to the B-tree 154 causing the B-tree reader buffer 420 to be stale or out of date). In order to improve performance and invalidate bad traversals caused by concurrent writes, the B-tree reader 410, in some implementations, determines a predicted location of a leaf node 312 to be read from the B-tree 154 based on the B-tree reader buffer 420. The B-tree reader 410 then determines whether the predicted location of the leaf node 312 is accurate by using the cluster-level file system 230 to read the predicted location of the leaf node from the B-tree 154. When the prediction is correct, the B-tree reader 410 may determine that the B-tree reader buffer 420 is sufficiently up to date and need not perform any additional reads from the cluster-level file system 230. When the prediction is not correct, the B-tree reader 410 may determine that the B-tree reader buffer 420 is out of date and retrieve the path (i.e., the nodes 312 from the parent node 312 to the leaf node 312) via the cluster-level file system 230 to update the B-tree reader buffer 420.

In some examples, each node 312 includes a fence key defining the range of keys the node 312 is responsible for even if the keys are not present in the tree. Based on the fence keys (i.e., fence key validation), the B-tree reader 410 can quickly traverse the B-tree reader buffer 420 to predict the location of respective leaf node 312. Optionally, the B-tree controller 160 exposes a watermark for the queue 222 or the flush buffer to allow the B-tree reader to determine a freshness of reads. For example, a significant number of operations in the queue 222 or the flush buffer may indicate that reads are more out of date relative to a lower number of operations in the queue 222. The B-tree reader 410 may schedule read operations based on the watermark (e.g., delay reads until the watermark is sufficiently low).

Thus, implementations herein include a single writer B-tree architecture on disaggregated memory. The B-tree 154 may be used as a primary or secondary index for a database, such as the cloud database 152 (i.e., to store mappings between primary keys and row locations). The B-tree 154 may be used as a generic high-performance distributed data structure, such as for a high performance in-memory key-value store which may scale larger than local memory while still providing excellent durability. The B-tree readers 410 read directly from local memory in a lock-free manner and do not affect write performance, as the load is generally very low on each server 158 (i.e., because the B-tree 154 is spread across a sufficient quantity of servers 158). The single writer of the B-tree writer 220 provides high performance by leveraging immediate and opportunistic batching to maximize throughput of the cluster-level file system 230. In some examples, the database may be sharded such that the database is split into multiple partitions. In these examples, there may be a single writer (i.e., B-tree writer 220) per shard or partition. The implementations herein are compatible with replicated remote storage for disaster recovery, as any replication scheme may be used for remote memory storage. Additionally, the B-tree controller 160 makes use of one-sided remote direct memory access (RDMA) such that no computation is required by remote memory hosts (i.e., the servers 158) when their respective B-tree portions 156 are read.

Figure 5:
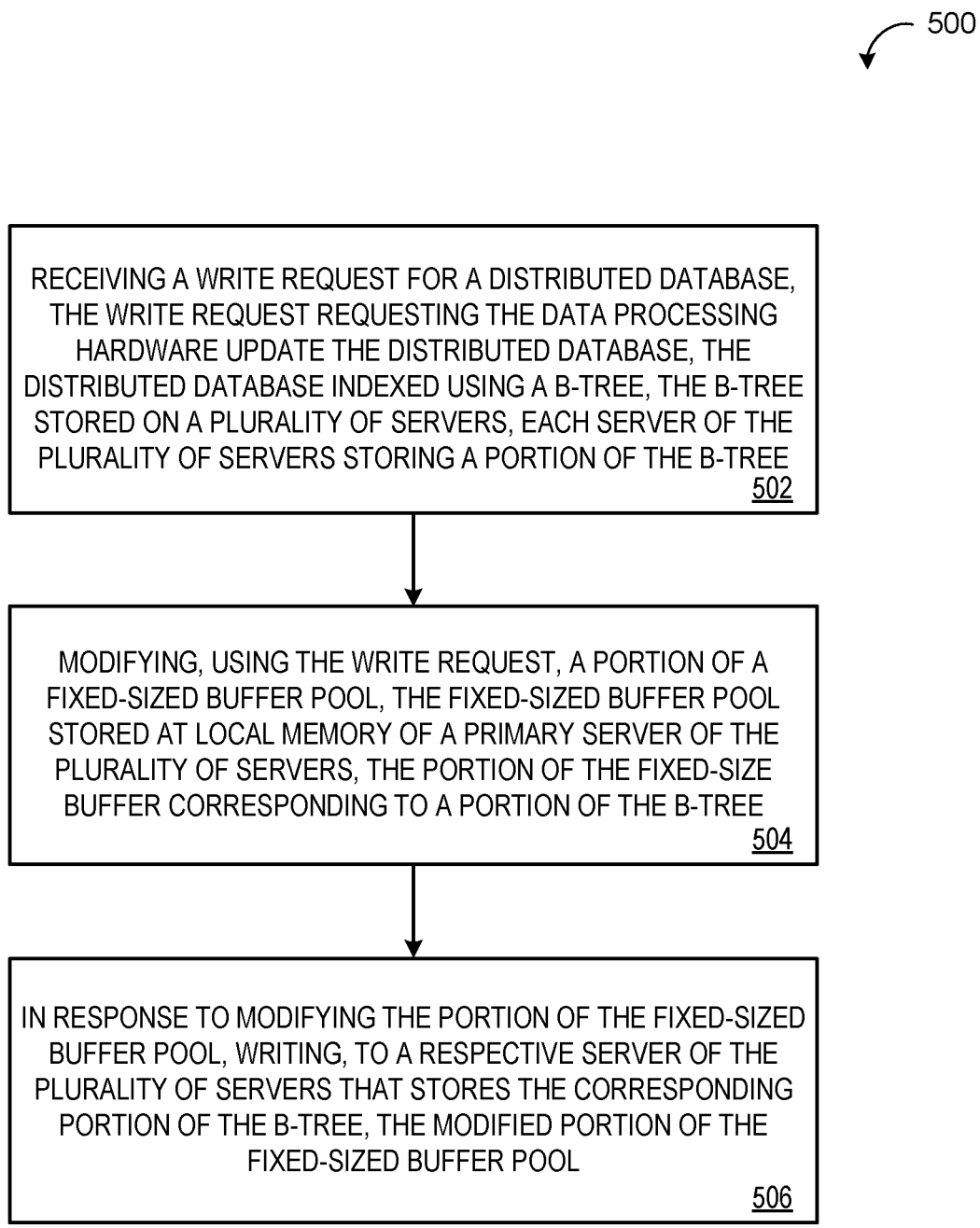
FIG. 5 is a flowchart of an example arrangement of operations for a method for a single writer B-tree architecture on disaggregated memory.

FIG. 5 is a flowchart of an exemplary arrangement of operations for a method 500 of a single writer B-tree architecture on disaggregated memory. The computer-implemented method 500, when executed by data processing hardware 144, causes the data processing hardware 144 to perform operations. The method 500, at operation 502, includes receiving a write request 20 for a distributed database 152. The write request requests the data processing hardware 144 update the distributed database 152. The distributed database 152 is indexed using a B-tree 154 that is stored on a plurality of servers 158. Each server 158 of the plurality of servers 158 stores a portion 156 of the B-tree 154. At operation 504, the method 500 includes modifying, using the write request 20, a portion 212 of a fixed-size buffer pool 210. The fixed-size buffer pool 210 is stored at local memory 159 of a primary server 158 of the plurality of servers 158. The portion 212 of the fixed-size buffer pool 210 corresponds to a portion 156 of the B-tree 154. The method 500, at operation 506, in response to modifying the portion 212 of the fixed-size buffer pool 210, includes writing, to a respective server 158 of the plurality of servers 158 that stores the corresponding portion 156 of the B-tree 154, the modified portion 212 of the fixed-size buffer pool 210.

Figure 6:
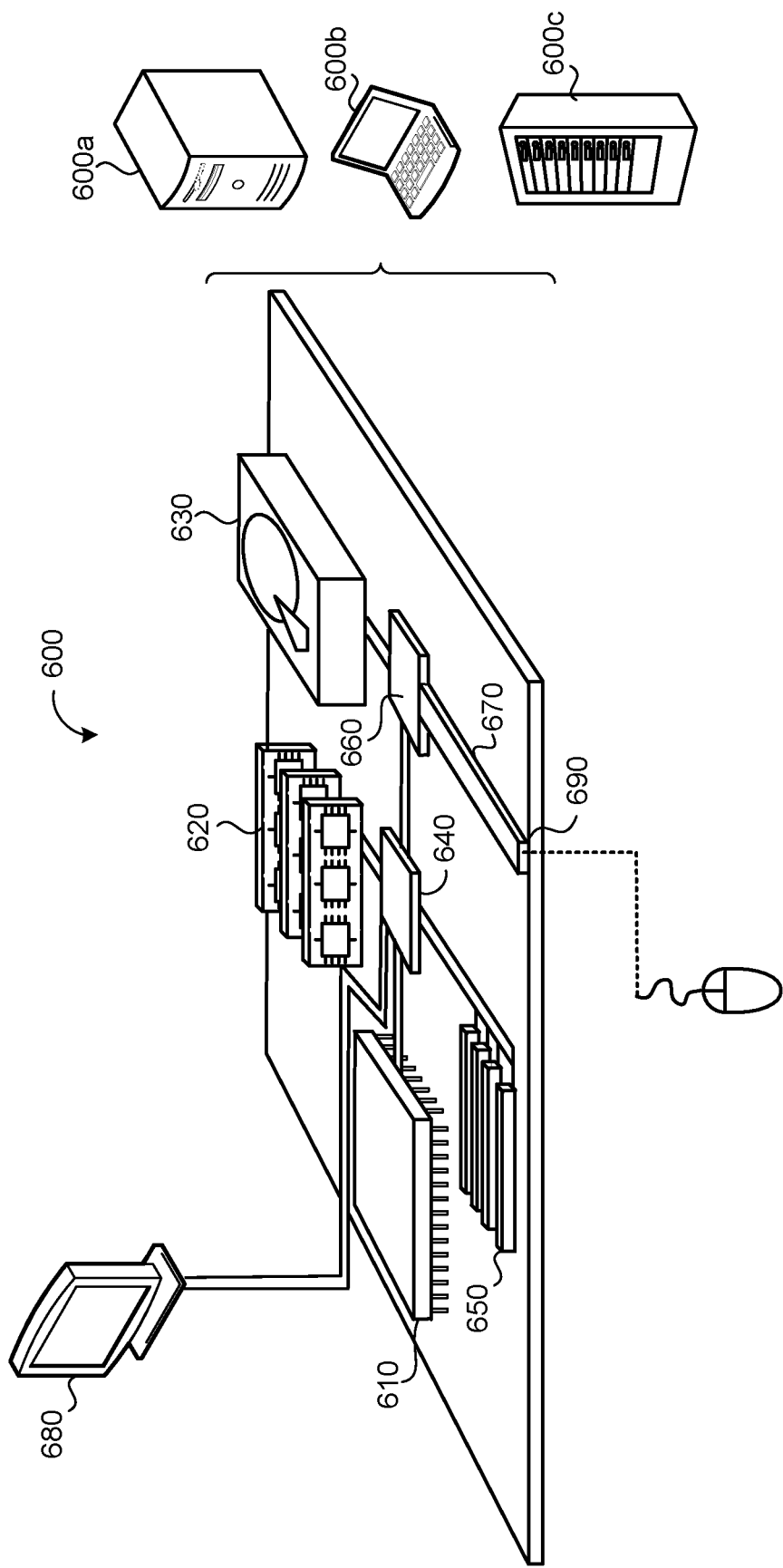
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
   receiving, by data processing hardware, a write request for a distributed database, the write request requesting the data processing hardware update the distributed database, the distributed database indexed using a B-tree, the B-tree stored on a plurality of servers, each server of the plurality of servers storing a portion of the B-tree;
   generating, by the data processing hardware, a modified portion of a fixed-size buffer pool by at least modifying, using the write request, a portion of the fixed-size buffer pool, the fixed-size buffer pool stored at local memory of a primary server of the plurality of servers, the portion of the fixed-size buffer pool corresponding to a portion of the B-tree, wherein the portion of the B-tree is stored at a respective server of the plurality of servers and the respective server is different than the primary server;

prior to writing the modified portion of the fixed-size buffer pool, determining, by the data processing hardware, whether another pending write that is based on a second write request modified the same portion or a different portion of the fixed-size buffer pool;

responsive to determining that the other pending write modified the same portion of the fixed-size buffer pool, writing, by the data processing hardware and to the respective server of the plurality of servers, the modified portion of the fixed-size buffer pool in an order based on an order the write request and the second write request were received; and responsive to determining that the other pending write modified the different portion of the fixed-size buffer pool, writing, by the data processing hardware and to the respective server of the plurality of servers, the modified portion of the fixed-size buffer pool in an order that is not based on an order the write request and the second write request were received.

2. The method of claim 1, wherein writing the modified portion of the fixed-size buffer pool comprises using an in-memory cluster-level file system.

3. The method of claim 2, wherein each write request maps to a single transaction of the in-memory cluster-level file system.

4. The method of claim 1, wherein writing the modified portion of the fixed-size buffer pool comprises:

prior to writing the modified portion of the fixed-size buffer pool, determining that another pending write based on a second write request modified the same portion of the fixed-size buffer pool; and in response to determining that the other pending write modified the same portion of the fixed-size buffer pool, writing, to the respective server, the modified portion based on the write request and the modified portion based on the second write request simultaneously.

5. The method of claim 1, wherein writing the modified portion of the fixed-size buffer pool comprises pushing a write for the modified portion of the fixed-size buffer pool into a first in first out (FIFO) data structure.

6. The method of claim 5, wherein writing the modified portion of the fixed-size buffer pool further comprises generating, using each write stored in the FIFO, a dependency graph.

7. The method of claim 6, wherein writing the modified portion of the fixed-size buffer pool further comprises batching multiple writes together based on the dependency graph.

8. The method of claim 1, further comprising:

receiving, by the data processing hardware, a read request for the distributed database, the read request requesting the data processing hardware read data from the distributed database;

based on receiving the read request, retrieving, by the data processing hardware and from a second subset of the plurality of servers, one or more portions of the B-tree;

storing, by the data processing hardware, the one or more portions of the B-tree at a second fixed-size buffer pool for the B-tree, the second fixed-size buffer pool stored at local memory of a secondary server of the plurality of servers, the second server different from the primary server; and retrieving, by the data processing hardware and using the second fixed-size buffer pool, the data.

9. A system comprising:

data processing hardware; and memory hardware in communication with the data processing hardware, the memory hardware storing instructions that when executed on the data processing hardware cause the data processing hardware to:

receive a write request for a distributed database, the write request requesting the data processing hardware update the distributed database, the distributed database indexed using a B-tree, the B-tree stored on a plurality of servers, each server of the plurality of servers storing a portion of the B-tree;

generate a modified portion of a fixed-size buffer pool by at least modifying, using the write request, a portion of the fixed-size buffer pool, the fixed-size buffer pool stored at local memory of a primary server of the plurality of servers, the portion of the fixed-size buffer pool corresponding to a portion of the B-tree, wherein the portion of the B-tree is stored at a respective server of the plurality of servers and the respective server is different than the primary server;

prior to writing the modified portion of the fixed-size buffer pool, determine whether another pending write that is based on a second write request modified the same portion or a different portion of the fixed-size buffer pool;

responsive to determining that the other pending write modified the same portion of the fixed-size buffer pool, write, to the respective server of the plurality of servers, the modified portion of the fixed-size buffer pool in an order based on an order the write request and the second write request were received; and responsive to determining that the other pending write modified the different portion of the fixed-size buffer pool, write, to the respective server of the plurality of servers, the modified portion of the fixed-size buffer pool in an order that is not based on an order the write request and the second write request were received.

10. The system of claim 9, wherein the instructions that cause the data processing hardware to write the modified portion of the fixed-size buffer pool further include instructions that cause the data processing hardware to use an in-memory cluster-level file system.

11. The system of claim 10, wherein each write request maps to a single transaction of the in-memory cluster-level file system.

12. The system of claim 9, wherein the instructions that cause the data processing hardware to write the modified portion of the fixed-size buffer pool further include instructions that cause the data processing hardware to:

prior to writing the modified portion of the fixed-size buffer pool, determine that another pending write based on a second write request modified the same portion of the fixed-size buffer pool; and in response to determining that the other pending write modified the same portion of the fixed-size buffer pool, write, to the respective server, the modified portion based on the write request and the modified portion based on the second write request simultaneously.

13. The system of claim 9, wherein the instructions that cause the data processing hardware to write the modified portion of the fixed-size buffer pool further include instructions that cause the data processing hardware to push a write for the modified portion of the fixed-size buffer pool into a first in first out (FIFO) data structure.

14. The system of claim 13, wherein the instructions that cause the data processing hardware to write the modified portion of the fixed-size buffer pool further include instructions that cause the data processing hardware to generate, using each write stored in the FIFO, a dependency graph.

15. The system of claim 14, wherein the instructions that cause the data processing hardware to write the modified portion of the fixed-size buffer pool further include instructions that cause the data processing hardware to batch multiple writes together based on the dependency graph.

16. The system of claim 9, wherein the instructions further cause the data processing hardware to:
   receive a read request for the distributed database, the read request requesting the data processing hardware read data from the distributed database;
   based on receiving the read request, retrieve, from a second subset of the plurality of servers, one or more portions of the B-tree;
   store the one or more portions of the B-tree at a second fixed-size buffer pool for the B-tree, the second fixed-size buffer pool stored at local memory of a secondary server of the plurality of servers, the second server different from the primary server; and
   retrieve, using the second fixed-size buffer pool, the data.

\* \* \* \* \*